H. S. Bartholomew,
Bit Stock.
No. 103,281.  Patented May 24, 1870.
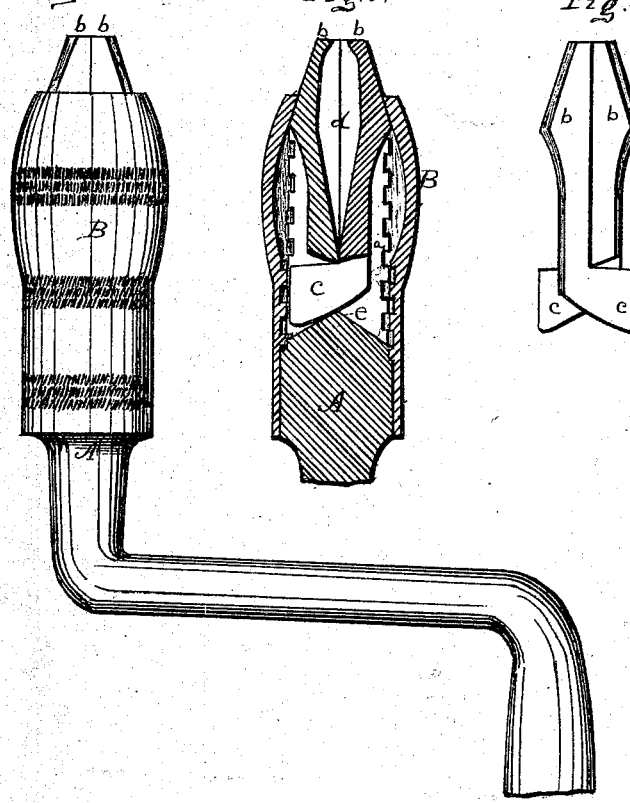

UNITED STATES PATENT OFFICE.

HARRY S. BARTHOLOMEW, OF BRISTOL, CONNECTICUT.

IMPROVEMENT IN BIT-STOCKS.

Specification forming part of Letters Patent No. 103,281, dated May 24, 1870.

I, HARRY S. BARTHOLOMEW, of Bristol, in the county of Hartford and State of Connecticut, have invented a new and useful Improvement in Bit-Braces, of which the following is a specification:

My invention consists in the peculiar construction and arrangement of the griping-jaws within a thimble-nut, as hereafter more fully described.

In the accompanying drawings, Figure 1 is a side elevation of my invention; Fig. 2, a longitudinal section of the same on a line through the center of the griping-jaws; Fig. 3, a side elevation of said jaws, and Fig. 4 an edge view of the same with shaft.

On the end of the brace proper is formed a shaft, A, which is properly threaded, and a slot, $a$, is made lengthwise through its center, of sufficient width to admit the griping-jaws $b\ b$. The bottom of the slot $a$ has a ridge, $e$, at its center, which is beveled outward each way in roof-like form, as clearly shown in Fig. 2.

The outside of the upper or outer ends of the jaws $b\ b$ is tapering to conform to the shape of the inside of the thimble-nut B. The lower end of each jaw $b$ is provided with a wing, $c$, the end of which is at an angle to the length of said jaws. The wings $c\ c$ are about one-half of the thickness of the body of the jaws $b\ b$, so that the wings may cross each other without being thicker than the body of the jaws.

By making the wings $c\ c$ thinner than the body of the jaws a shoulder is formed on each jaw, which rests on the upper side or edge of the wings $c\ c$, thus firmly connecting the jaws, so that they shall always move together in the direction of their length, while at the same time they are perfectly free to open and close.

The operation is as follows: The thimble-nut B, which is properly threaded to fit the thread on shaft A, is turned outward or toward the end of jaws $b\ b$, which will allow said jaws to open sufficiently to admit the shank of a tool in the cavity $d$ between them. The nut B is then turned back, when the inside of said nut, near its mouth, will strike the tapering sides of the jaws $b\ b$ and cause them to close on the shank of the tool, and also force the ends of the wings $c\ c$ onto the ridge $e$, which will throw the inner end of the jaws $b\ b$ toward each other until they also gripe the shank of the tool, when the same is securely held in place. The jaws being thus forced together from each end will always conform to the shank of the tool being held, whether it is tapering or straight.

I do not claim a brace constructed as shown in the patents to Charles H. Amidon, May 29, 1867, and to R. D. O. Smith, September 8, 1868.

I claim as my invention—

The jaws $b\ b$, constructed with the wings $c\ c$ crossing each other, as described, in combination with the ridge $e$, threaded and slotted shaft A, and the thimble-nut B, all constructed and operating together, substantially as described.

HARRY S. BARTHOLOMEW.

Witnesses:
JAMES SHEPARD,
C. A. SHEPARD.